(12) United States Patent
Westendorf

(10) Patent No.: US 9,555,842 B1
(45) Date of Patent: Jan. 31, 2017

(54) ADAPTER BRACKET ASSEMBLY CONFIGURED TO ADAPT A UTILITY VEHICLE FOR USE WITH A DIFFERENT UTILITY COMPONENT

(71) Applicant: WESTENDORF MANUFACTURING CO., INC., Onawa, IA (US)

(72) Inventor: Neal Walter Westendorf, Onawa, IA (US)

(73) Assignee: Westendorf Manufacturing Co., Inc., Onawa, IA (US)

(*) Notice: Subject to any disclaimer, the term of this patent is extended or adjusted under 35 U.S.C. 154(b) by 0 days.

(21) Appl. No.: 14/616,871

(22) Filed: Feb. 9, 2015

Related U.S. Application Data

(60) Provisional application No. 61/974,532, filed on Apr. 3, 2014.

(51) Int. Cl.
*B62D 49/06* (2006.01)
*B62D 49/02* (2006.01)

(52) U.S. Cl.
CPC ............ *B62D 49/065* (2013.01); *B62D 49/02* (2013.01)

(58) Field of Classification Search
CPC .............................. B62D 49/065; B62D 49/02
USPC ............................................. 37/468; 414/723
See application file for complete search history.

(56) References Cited

U.S. PATENT DOCUMENTS

| | | | | |
|---|---|---|---|---|
| 5,549,440 | A * | 8/1996 | Cholakon et al. | 414/723 |
| 6,336,785 | B1 * | 1/2002 | Kunzman | 414/723 |
| 7,958,657 | B2 * | 6/2011 | Sakamoto | E02F 3/627 37/468 |
| 2002/0157286 | A1 * | 10/2002 | Fatemi | 37/403 |
| 2008/0083144 | A1 * | 4/2008 | Sederberg | E02F 3/3604 37/468 |

* cited by examiner

*Primary Examiner* — Faye M Fleming
(74) *Attorney, Agent, or Firm* — Joseph M. Butscher; The Small Patent Law Group, LLC

(57) ABSTRACT

An adapter bracket assembly is configured to allow a tractor to operatively connect to a different, otherwise incompatible utility component. The adapter bracket assembly includes an attachment member configured to securely connect to an attachment bracket that is compatible with the tractor, and a component-engaging member that is configured to securely connect to the different utility component in order to securely and operatively connect the different utility component to the tractor.

27 Claims, 9 Drawing Sheets

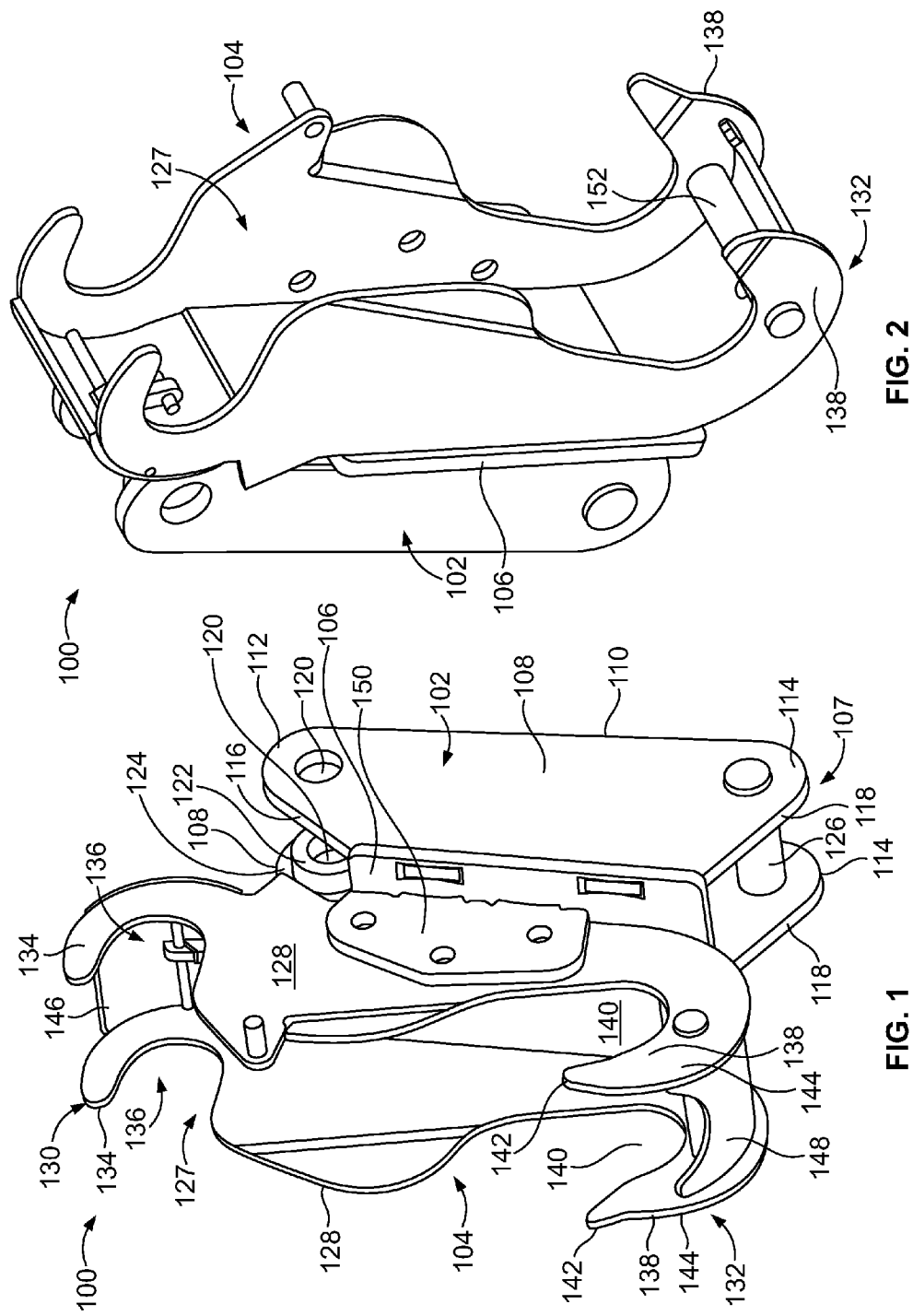

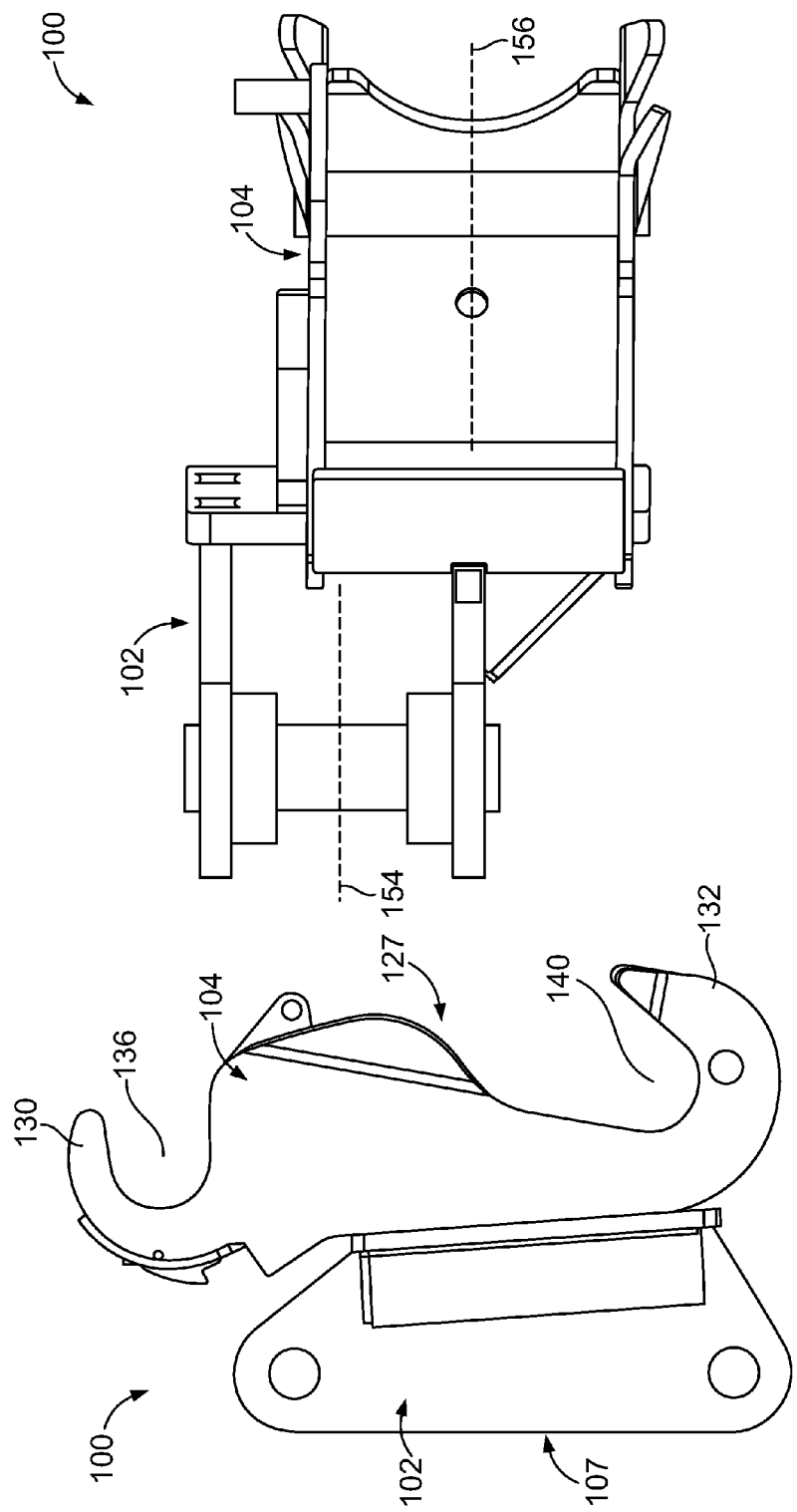

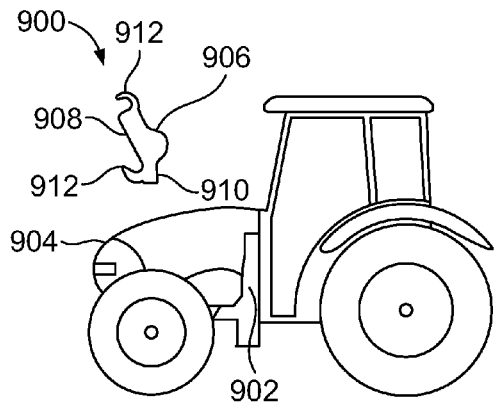
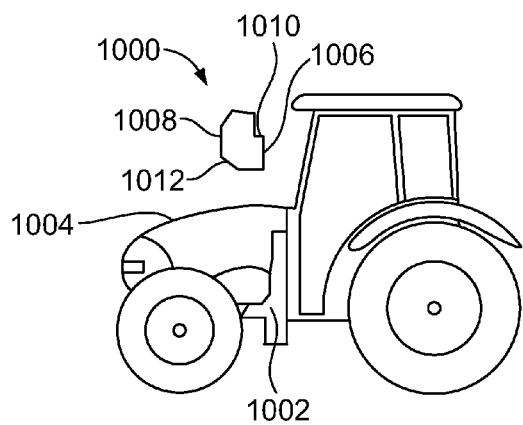
FIG. 22  FIG. 23
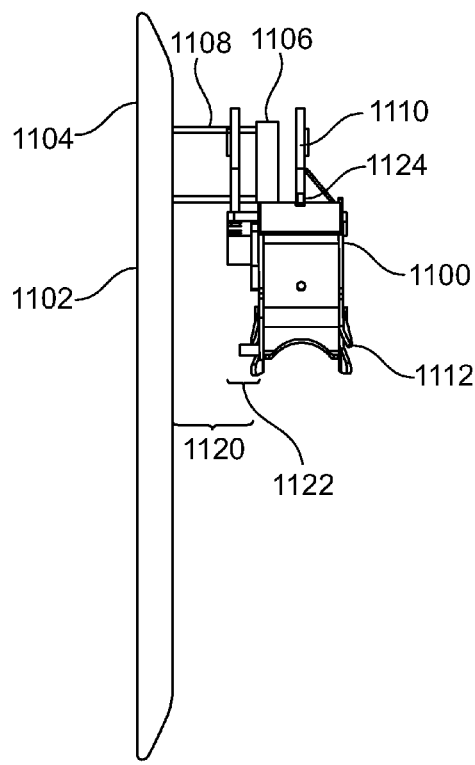
FIG. 24

ADAPTER BRACKET ASSEMBLY CONFIGURED TO ADAPT A UTILITY VEHICLE FOR USE WITH A DIFFERENT UTILITY COMPONENT

RELATED APPLICATIONS

This application relates to and claims priority benefits from U.S. Provisional Patent Application No. 61/974,532 entitled "Adapter Bracket Assembly Configured to Adapt a Utility Vehicle for Use With a Different Utility Component," filed Apr. 3, 2014, which is hereby incorporated by reference in its entirety.

FIELD OF THE DISCLOSURE

Embodiments of the present disclosure generally relate to adapter bracket assemblies that are configured to secure to attachment brackets that connect to utility vehicles in order to allow a different utility component (which may be, for example, incompatible, non-compliant, or otherwise inoperable with respect to the utility vehicles and/or the attachment brackets) to be used with the utility vehicles.

BACKGROUND OF THE DISCLOSURE

Work or utility vehicles, such as tractors, are often adapted to be used with various types of attachments. For example, a loader may be attached to the front of a tractor through arms and hydraulic controls that allow the loader to be raised and lowered, and also rolled forward and backward. Many different attachment or implements may be attached to the front of the work vehicles, thereby allowing an operator to accomplish various tasks with a single work vehicle.

Conventional front-end loaders include a pair of lifting arms or boom assemblies that include towers or rearward ends that pivotally attach to a tractor, and lifting arms or forward ends that pivotally attach to an implement. Generally, the arms of the loader and the attached implement may be controlled by a hydraulic system. Hydraulic cylinders may be configured to operate front-end loaders and their attached implements. Hydraulic lines may extend along an exterior (or routed along the interior) of the front-end loaders for powering the hydraulic cylinders.

A manufacturer of a particular work or utility vehicle typically prefers that utility components (for example, attachments, implements, and the like) of that particular manufacturer be used with the particular vehicle. For example, a manufacturer of a particular tractor prefers that a front loader produced by that manufacturer be used with the particular tractor.

In order to ensure additional and increased sales of equipment, a typical manufacturer provides a specialized attachment bracket that may be attached to a utility vehicle. The specialized attachment bracket may be sold with the utility vehicle, for example. The specialized attachment bracket is typically designed and configured to allow use of only a particular type of utility component produced by the manufacturer. For example, a manufacturer sells a tractor with specialized attachment brackets that may be secured to the tractor and used to connect a particular utility component (produced by the manufacturer) to the tractor. The attachment brackets generally are not compatible with utility components of other manufacturers. In this manner, the manufacturer ensures that if a customer later decides to purchase a utility component, such as a front loader, the customer typically purchases the utility component of the manufacturer.

However, an individual may own a utility vehicle, such as a tractor, produced by a first manufacturer, and a utility component, such as a front loader, produced by a second manufacturer that differs from the first manufacturer. As such, the individual may view the purchase of another utility component produced by the first manufacturer to be expensive and wasteful.

Further, if an individual prefers to use the different utility component (a "different" utility component being, for example, incompatible, non-compliant, or otherwise inoperable with respect to the utility vehicle and/or attachment bracket) with the utility vehicle, the individual typically needs to first remove the originally-supplied attachment bracket that connects to the utility vehicle. A separate and distinct attachment bracket that is compatible with the utility component is then positioned on the utility component. Again, however, the individual may find the expense of the separate and distinct attachment bracket to be excessive. Further, the removed attachment bracket is typically discarded or otherwise not used, which is wasteful.

Thus, a need exists for a system and method of efficiently using utility components with utility vehicles, whether or not the components and vehicles are manufactured by the same entity.

SUMMARY OF THE DISCLOSURE

Certain embodiments of the present disclosure provide an adapter bracket assembly configured to allow a utility vehicle to operatively connect to a different, otherwise incompatible utility component. The adapter bracket assembly may include an attachment member configured to securely connect to an attachment bracket that is compatible with the utility vehicle, and a component-engaging member that is configured to securely connect to the different utility component in order to securely and operatively connect the different utility component to the utility vehicle.

The different utility component may be incompatible with the utility vehicle and unable to be used with the utility vehicle without the adapter bracket assembly. The different utility component may be incompatible, non-compliant, and/or inoperable with respect to the utility vehicle, if not for the adapter bracket assembly. For example, the utility vehicle may be manufactured by a first manufacturer, and the different utility component may be manufactured by a second manufacturer that differs from the first manufacturer.

Each of the attachment member and the component-engaging member may include one or more of a wall(s), a panel(s), an arcuate surface(s), a bar(s), a hook(s), a clasp(s), one or more latches, a stud(s), and/or the like. The adapter bracket assembly may include a transition connection interface that connects the attachment member to the component-engaging member. The attachment member may be axially offset from the component-engaging member.

The attachment member may include a first connecting interface that is compatible with the attachment bracket. The component-engaging member may include a second connecting interface that is compatible with the different utility component. For example, the first connecting interface may mimic (for example, be sized, shaped, and configured the exact same as) a compatible connecting interface of a compatible utility component that is compatible with the attachment bracket. The first connecting interface may be sized, shaped, and configured as a connecting interface of a compatible utility component that is compatible with the utility vehicle and configured to directly connect to the attachment bracket without the adapter bracket assembly. The second connecting interface may be sized, shaped, and configured as a connecting interface of a different attachment bracket that is incompatible with the utility vehicle and configured to directly connect to the different utility component.

In at least one embodiment, the attachment may include opposed lateral panels having outer exposed edges connected to upper and lower arcuate ends. Each of the upper and lower arcuate ends may connect to connecting edges that may, in turn, connect to a transition connection interface. Each of the upper arcuate ends may include a first hole and a cylindrical rim. Each lower arcuate end may connect to a cylindrical bar.

In at least one embodiment, the component-engaging member includes first and second grappling claws. At least one of the first and second grappling claws may include opposed prongs. Each prong may include an outwardly flared distal tip.

The adapter bracket assembly may also include a hydraulic manifold secured to one or more portions of one or both of the attachment member or the component-engaging member. For example, the hydraulic manifold may be secured to an outer lateral wall of the attachment member and/or the component-engaging member.

Certain embodiments of the present disclosure provide a system that may include a utility vehicle and an attachment bracket secured to the utility vehicle. The attachment bracket is compatible with the utility vehicle and a first utility component. The system may also include an adapter bracket assembly that is configured to connect to both of (a) a second utility component that differs from the first utility component and (b) the attachment bracket. The second utility component is unable to be used with the attachment bracket without the adapter bracket assembly. The utility vehicle may be a tractor. Each of the first and second utility components may be a loader, backhoe, crane, grappling assembly, boom, or the like.

Certain embodiments of the present disclosure provide a method of securing a different utility component to a utility vehicle. The different utility component is otherwise incompatible with the utility vehicle. The method may include securing an attachment member of an adapter bracket assembly to an attachment bracket that connects to the utility vehicle. The attachment bracket is otherwise only compatible with the utility vehicle and a first utility component. The method may also include connecting a second utility component that differs from the first utility component to a component-engaging member of the adapter bracket assembly. The second utility component is unable to be used with the attachment bracket without the adapter bracket assembly.

BRIEF DESCRIPTION OF THE DRAWINGS

FIG. 1 illustrates a perspective lateral view of an adapter bracket assembly from a first side, according to an embodiment of the present disclosure.

FIG. 2 illustrates a perspective lateral view of an adapter bracket assembly from a second side, according to an embodiment of the present disclosure.

FIG. 3 illustrates a lateral view of an adapter bracket assembly, according to an embodiment of the present disclosure.

FIG. 4 illustrates a top view of an adapter bracket assembly, according to an embodiment of the present disclosure.

FIG. 22 illustrates a lateral view of an adapter bracket assembly disconnected from an attachment bracket of a utility vehicle, according to an embodiment of the present disclosure.

FIG. 23 illustrates a lateral view of an adapter bracket assembly disconnected from an attachment bracket of a utility vehicle, according to an embodiment of the present disclosure.

FIG. 24 illustrates an end view of an adapter bracket assembly secured to an attachment bracket, according to an embodiment of the present disclosure.

Figure 5:
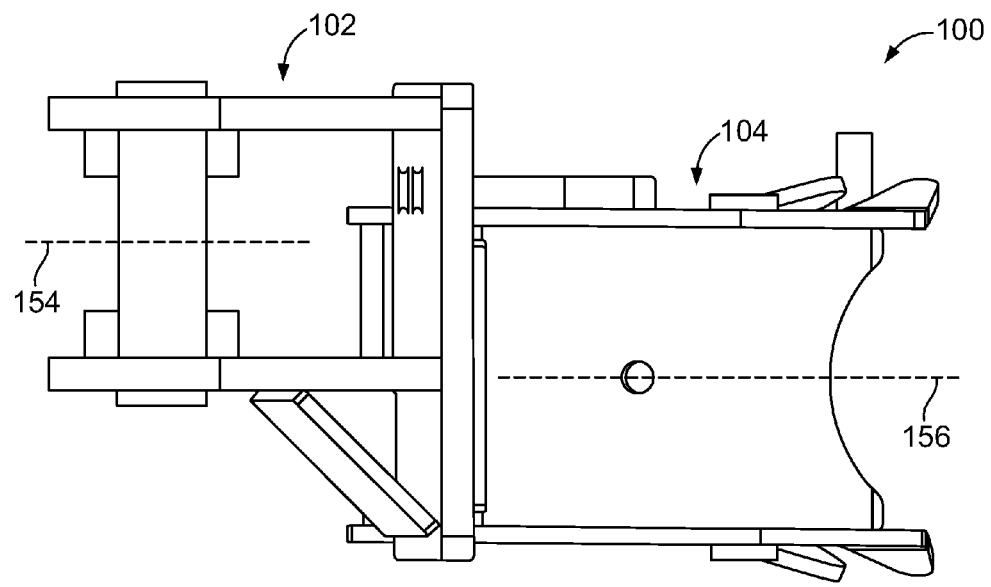
FIG. 5 illustrates a bottom view of an adapter bracket assembly, according to an embodiment of the present disclosure.

Before the embodiments are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Embodiments of the present disclosure provide adapter bracket assemblies that are configured to allow a utility vehicle to connect to a different utility component, such as a front loader, backhoe, crane, boom, grappling assembly, and/or the like. In particular, the adapter bracket assemblies are configured to connect to attachment brackets that are compatible with the utility vehicle (for example, the attachment brackets may be originally supplied with the utility vehicle or otherwise specifically designed and sold to be compatible with the utility vehicle and a particular utility component). The adapter bracket assemblies are configured to connect different utility components to the attachment bracket, thereby allowing the different utility components to be used with utility vehicles and attachment brackets that would otherwise be incompatible, non-compliant, or otherwise inoperable therewith.

As used herein, the term different in relation to a utility component means incompatible, non-compliant, inoperable, or the like with respect to the utility vehicles and/or attachment brackets. For example, a first utility component manufactured by a first manufacturer is different than a second utility component manufactured by a second manufacturer that is separate and distinct from the first manufacturer. Similarly, a utility vehicle manufactured by the first manufacturer is different than the second utility component manufactured by the second manufacturer.

Certain embodiments of the present disclosure provide an adapter bracket assembly that is configured to allow a utility vehicle to connect to a different utility component (for example, a utility component that is manufactured by an entity that differs from the entity that manufacturers the utility vehicle). The adapter bracket assembly may include an attachment member configured to securely connect to an attachment bracket that is compatible with the utility vehicle, and a component-engaging member that is configured to securely connect to the different utility component in order to securely connect the different utility component to the utility vehicle.

Certain embodiments of the present disclosure provide a system that may include a utility vehicle, and an attachment bracket secured to the utility vehicle. The attachment bracket is typically compatible only with the utility vehicle and a first utility component. An adapter bracket assembly connects to the attachment bracket. The adapter bracket assembly is configured to connect a second utility component that differs from the first utility component to the attachment bracket. The second utility component is incompatible with the attachment bracket without the adapter bracket assembly.

Certain embodiments of the present disclosure provide a method of securing a different utility component to a utility vehicle. The method may include securing an attachment member of an adapter bracket assembly to an attachment bracket that connects to the utility vehicle. The attachment bracket is otherwise only compatible with the utility vehicle and a first utility component. The method also includes connecting a second utility component that differs from the first utility component to a component-engaging member of the adapter bracket assembly. The second utility component is incompatible with the attachment bracket without the adapter bracket assembly.

Certain embodiments of the present disclosure allow a loader manufactured by one company to be mounted on a loader mount (such as an attachment bracket) manufactured by a different company.

FIG. 1 illustrates a perspective lateral view of an adapter bracket assembly 100 from a first side, according to an embodiment of the present disclosure. The adapter bracket assembly 100 may be a transformer bracket assembly that is configured to be secured to an attachment bracket that may be secured to a utility vehicle in order to adapt or transform the utility vehicle for use with a utility component (for example, a front loader, backhoe, grappling assembly, and/or the like) that is different than (for example, would otherwise be incompatible, non-compliant, and/or inoperable with) the utility vehicle and/or the attachment bracket. For example, the utility vehicle may be manufactured and produced by a first manufacturer, while the utility component may be manufactured and produced by a second manufacturer that is different from the first manufacturer. The attachment bracket that secures to the utility vehicle may also be manufactured by the first manufacturer and may generally be configured to allow use of only a single type of utility component, such as one or more attachments produced by the first manufacturer. The adapter bracket assembly 100 is configured to connect to a portion of the attachment bracket in order to transform or adapt the attachment bracket to be used with a different type of utility component, such as manufactured by the second manufacturer.

The adapter bracket assembly 100 may be formed of metal, for example, and includes an attachment member 102, such as one or more of a sleeve(s), panel(s), cage(s), joint(s), housing(s), and/or other such structure(s) that connects to a component-engaging member 104, such as one or more of an engaging claw(s), joint(s), sleeve(s), panel(s), housing(s), fastener(s), and/or the like. The attachment member 102 may connect to the component-engaging member 104 through a transition connection interface 106, such as a panel, sheet, plate, and/or the like. Alternatively, the attachment member 102 may directly connect to the component-engaging member 104 without a transition connection interface 106.

The attachment member 102 is configured to securely connect to a portion of an attachment bracket, which may be removably secured to a utility vehicle, such as a tractor. As such, the attachment member 102 may include the same connecting interface(s) as that of a compatible utility component that is otherwise adapted for use with the attachment bracket. For example, the attachment member 102 may include a connecting interface(s) 107 that is similar to or the same as that of a utility component produced by a first manufacturer.

As shown in FIG. 1, the attachment member 102 may include opposed lateral panels 108 having outer exposed edges 110 connected to upper and lower arcuate ends 112 and 114, respectively. Each of the upper and lower arcuate ends 112 and 114 connect to connecting edges 116 and 118, respectively, that connect to the transition connection interface 106. As shown, the transition connection interface 106 may generally reside in a plane that is perpendicular to planes in which the lateral panels 108 reside. The panels 108 may be integrally molded and formed with the transition connection interface 106 as a single piece. Optionally, the panels 108 may be separately connected to the transition connection interface 106, such as through welding, fasteners, and the like.

A pin-receiving hole 120 is formed through each upper arcuate end 112. A cylindrical rim 122 extends from an inner surface 124 and axially surrounds an aligned passage that connects to the hole 120. The holes 120 of the opposed lateral panels 108 may be axially aligned with one another, as shown in FIG. 1. A rod 126 extends between opposed lower arcuate ends 114 of the opposed lateral panels 108. The connecting interface 107 may be defined, at least in part, by the holes 120 and the rod 126. Alternatively, the holes 120 may be formed through the lower arcuate ends 114, while the rod extends between opposed upper arcuate ends 112.

Also, alternatively, various other connection interfaces may be used, depending on the configuration of the attachment bracket to which the attachment member 102 is configured to secure. For example, the attachment member 102 may include holes at either end, with no bar or rod. As another example, the attachment member 102 may include rods or bars at either end, with no holes.

The component-engaging member 104 includes a connecting interface(s) 127 that is configured to mate with and securely connect to a utility component that would otherwise be incompatible with the attachment bracket. For example, the component-engaging member 104 may include the connecting interface 127 that is similar to or the same as that of an attachment bracket that is specifically configured to secure to a utility component produced by a second manufacturer, which differs from the first manufacturer. Accordingly, the adapter bracket assembly 100 is configured to connect to the attachment bracket in order to adapt or transform the attachment bracket to be used with a different utility component.

The component-engaging member 104 may include opposed lateral walls 128 connected to an upper grappling claw 130 and a lower grappling claw 132. The component-engaging member 104 may be defined, at least in part, by the upper and lower grappling claws 130 and 132, respectively.

The upper grappling claws 130 may include opposed lateral arcuate fingers 134 defining interior channels 136. Each finger 134 may reside in a respective plane. Alternatively, distal tips of the fingers 134 may inwardly or outwardly extend from the respective planes. For example, a distal tip of a finger 134 may inwardly cant toward an opposed finger 134.

The lower grappling claws 132 may include opposed lateral prongs 138 defining interior channels 140. Each prong 138 may include an outwardly flared distal tip 142 that outwardly flares from a plane in which a main portion 144 of the prong 138 resides. Alternatively, the distal tips 142 may not outwardly flare.

As shown, the upper and lower grappling claws 130 and 132 may differ in size and shape. Optionally, the upper and lower grappling claws 130 and 132 may be similarly sized and shaped. For example, the lower grappling claw 132 may include opposed fingers, such as those of the upper grappling claw 130. Conversely, the upper grappling claw 130 may include opposed prongs, such as those of the lower grappling claw 132.

Each of the upper and lower grappling claws 130 and 132 may include an arcuate support brace 146 and 148, respectively. For example, the support brace 146 may be a curved sheet of metal that connects between the opposed fingers 134 proximate to an outer edge. Similarly, the support brace 148 may be a curved sheet of metal that connects between the opposed prongs 138 proximate to an outer edge. The support braces 146 and 148 may extend less than an entire length of the upper and lower grappling claws 130 and 132, respectively. Alternatively, the upper and lower grappling claws 130 and 132 may not include the support braces.

Each of the lateral walls 128 include base edges, which connect to the transition connection interface 106. A lateral support panel 150 may extend from the transition connection interface 106 and securely connect to an outer surface of one of the lateral walls 128. Optionally, a lateral support panel may connect to an outer surface of the other lateral wall 128, as well. As shown, the transition connection interface 106 may generally reside in a plane that is perpendicular to planes in which the lateral walls 128 reside. The lateral walls 128 and the upper and lower grappling claws 130 and 132 may be integrally molded and formed with the transition connection interface 106 as a single piece. Optionally, the lateral walls 128 and the upper and lower grappling claws 130 and 132 may be separately connected to the transition connection interface 106, such as through welding, fasteners, and the like. Overall, the entire assembly 100 may be integrally molded and formed as a single piece of material. Optionally, components of the entire assembly 100 may be separately molded and formed and connected together, such as through welding, fasteners, and the like.

The connecting interface 127 of the component-engaging member 104 may be sized, shaped, and configured the same as that of a different attachment bracket of a different utility vehicle that is configured to securely connect to a different utility component. As such, the connecting interface 127 may generally be compatible with a utility component that is specifically designed and configured for use with a particular attachment bracket of a particular utility vehicle. If not for the attachment member 102, the utility component would otherwise not be able to be used with a utility vehicle that differs from the particularly utility vehicle.

FIG. 2 illustrates a perspective lateral view of the adapter bracket assembly 100 from a second side, according to an embodiment of the present disclosure. As shown, a cylindrical post 152 may extend between opposed prongs 138 of the lower grappling claw 132.

FIG. 3 illustrates a lateral view of the adapter bracket assembly 100, according to an embodiment of the present disclosure. The size and shape of the attachment member 102 are configured to connect to an attachment bracket manufactured by a particular manufacturer. It is to be understood that the size and shape of the attachment member 102 may be sized and shaped differently than shown in order to connect to a different attachment bracket manufactured by another manufacturer, for example.

Similarly, the size and shape of the component-engaging member 104 are configured to connect to portions of a utility component manufactured by a particular manufacturer, which may be different than the manufacturer of the attachment bracket. It is to be understood that the size and shape of the component-engaging member 104 may be sized and shaped differently than shown in order to connect to a different utility component.

FIGS. 4 and 5 illustrate top and bottom views of the adapter bracket assembly 100, according to an embodiment of the present disclosure. As shown, the attachment member 102 may be offset from the component-engaging member 104. For example, a central longitudinal axis 154 of the attachment member 102 may not be coaxial with a central longitudinal axis 156 of the component-engaging member 104. Instead, the central longitudinal axis 154 may be shifted to one side of the central longitudinal axis 156. The offset nature between the attachment member 102 and the component-engaging member 104 may be configured to provide operational capability of a particular component that attaches to an attachment bracket through the adapter bracket assembly. The offset of the attachment member 102 with respect to the component-engaging member 104 may provide suitable clearance between a utility component and an attachment bracket, for example.

Referring to FIGS. 1-5, the adapter bracket assembly 100 is used to secure a utility component manufactured by a particular manufacturer to an attachment bracket of a utility vehicle manufactured by a different manufacturer. The adapter bracket assembly 100 allows what would otherwise be an incompatible utility component to be connected to and used with the utility vehicle.

Figure 6:
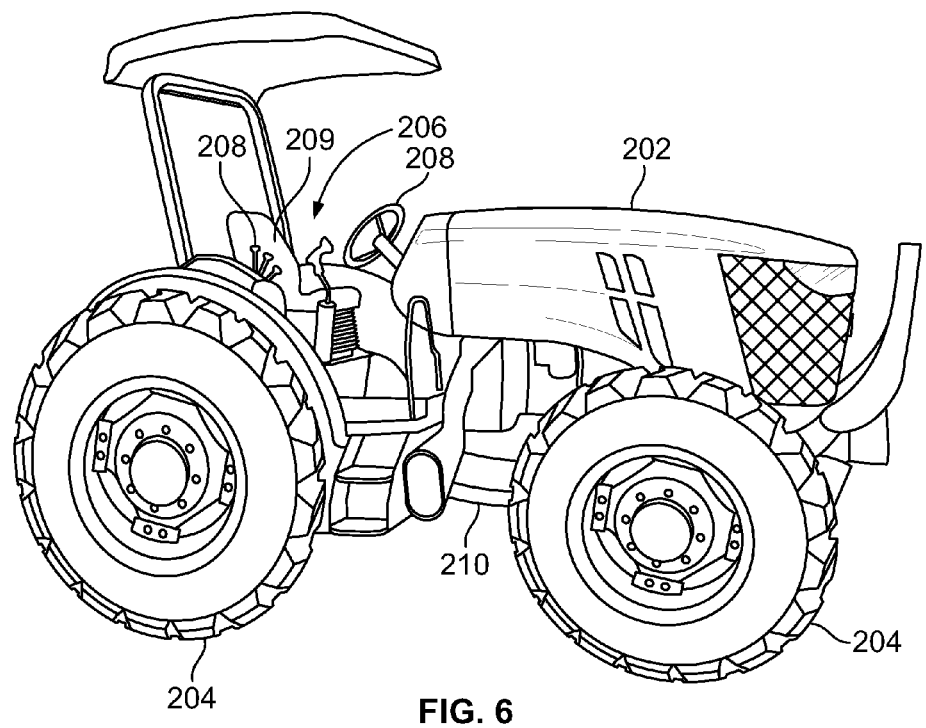
FIG. 6 illustrates a perspective lateral view of a utility vehicle, according to an embodiment of the present disclosure.

FIG. 6 illustrates a perspective lateral view of a utility vehicle 200, according to an embodiment of the present disclosure. The utility vehicle 20 may be a tractor, as shown, for example. However, the utility vehicle 200 may be various other types of utility vehicles that are configured to selectively utilize a variety of utility components. The utility vehicle 200 may be produced by a first manufacturer.

The utility vehicle 200 may include a main body 202 connected to four wheels 204. The main body 202 may include an operator cabin 206 including controls 208 and a seat 209.

The main body 202 also includes a bracket-connecting interface 210, which may be proximate to a middle lower section of the main body 202. The bracket-connecting interface 210 is configured to receive and retain a portion of an attachment bracket.

Figure 7:
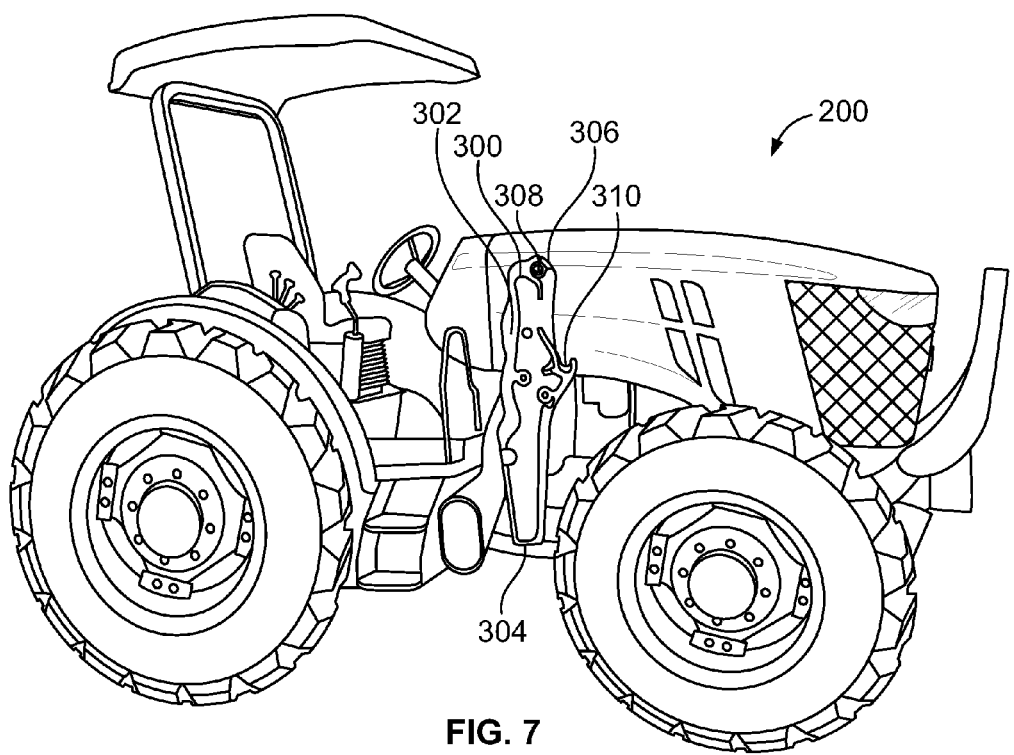
FIG. 7 illustrates a perspective lateral view of an attachment bracket secured to a utility vehicle, according to an embodiment of the present disclosure.

FIG. 7 illustrates a perspective lateral view of an attachment bracket 300 secured to the utility vehicle 200, according to an embodiment of the present disclosure. The attachment bracket 300 may generally be manufactured by the same manufacturer as the utility vehicle 200. As such, the attachment bracket 300 is configured and designed to be compatible with the utility vehicle 200.

The attachment bracket 300 may be formed of metal, and includes a longitudinal main body 302 having a vehicle-connecting end 304 that connects to the bracket-connecting interface 210, and a component-connecting end 306 opposite from the vehicle-connecting end 304. The component-connecting end 306 is shaped and sized to secure to a portion of a utility component that is specifically designed and configured to mate thereto. For example, the component-connecting end 306 may include an upper hole 308 spaced apart from a lower hook 310. The upper hole 308 and the lower hook 310 are specifically sized and shaped to secure to a portion of a utility component that is specifically designed and configured to mate thereto.

As described above, however, the adapter bracket assembly 100 (shown in FIGS. 1-5) includes the attachment member 102 that is configured to mate with the component-connecting end 306. The attachment member 102 includes the connecting interface 107, which mimics the connecting interface of a utility component that is compatible with the attachment bracket 300.

Figure 8:
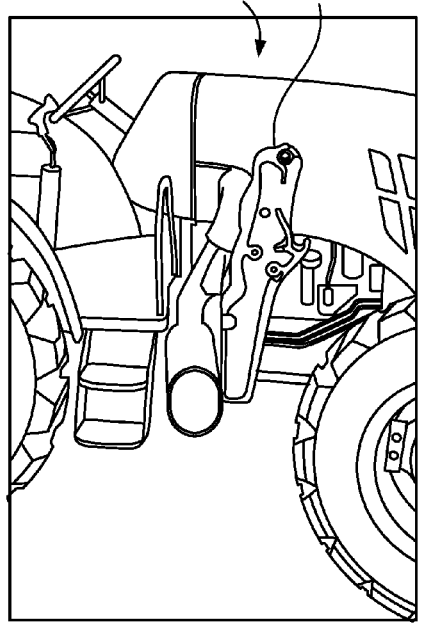
FIG. 8 illustrates a perspective lateral view of a first attachment bracket secured to a utility vehicle, according to an embodiment of the present disclosure.
Figure 9:
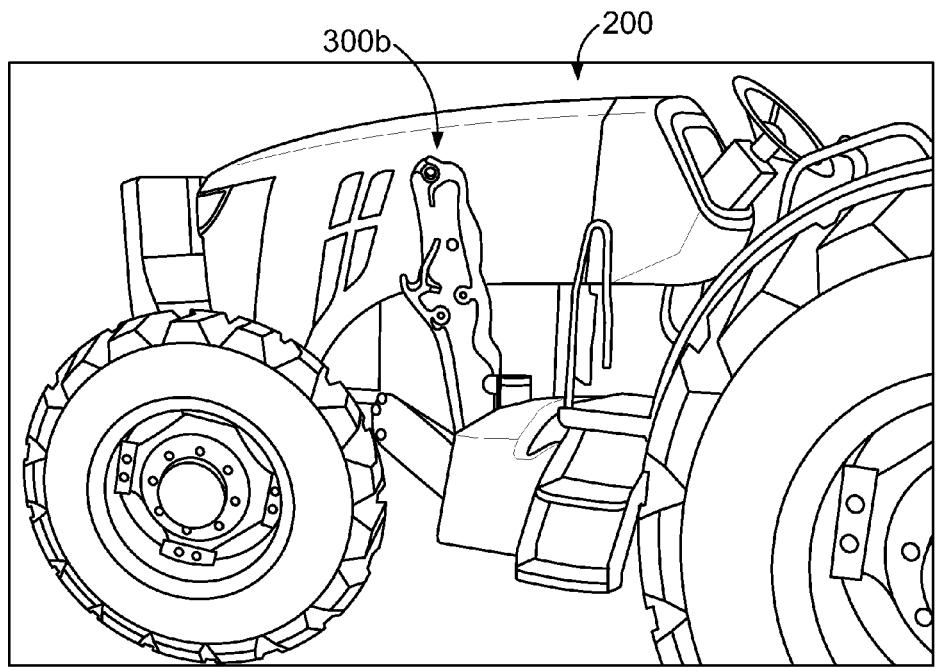
FIG. 9 illustrates a perspective lateral view of a second attachment bracket secured to a utility vehicle, according to an embodiment of the present disclosure.

FIG. 8 illustrates a perspective lateral view of a first loader mount or attachment bracket 300a secured to the utility vehicle 200, while FIG. 9 illustrates a perspective lateral view of a second loader mount or attachment bracket 300b secured to the utility vehicle 20. As shown, the attachment bracket 300a may be positioned on one side of the utility vehicle 200, while the attachment bracket 300b is secured to an opposite side of the utility vehicle 200.

As noted, the attachment brackets 300a and 300b may be loader mounts configured to connect to a loader that may be operatively connected to the utility vehicle 200 through the attachment brackets 300a and 300b. Alternatively, the attachment brackets 300a and 300b may be configured to securely connect different utility components (other than a loader) to the utility vehicle 200.

Referring to FIGS. 7-9, multiple attachment brackets 300 may be used. For example, an attachment bracket 300 may be positioned on either side of the utility vehicle 200. The attachment bracket 300 may be a removable component that is configured to allow a utility component produced by the first manufacturer to be connected to the utility vehicle 200. For example, the attachment bracket 300 may be a metal bracket that attaches to a portion of the utility vehicle 200. In general, the attachment bracket 300 is configured to connect a specific utility component to the utility vehicle 20. As an example, the attachment bracket 30 is sized, shaped, and configured to allow only a utility component produced by the first manufacturer to be used with the utility vehicle 20.

Figure 10:
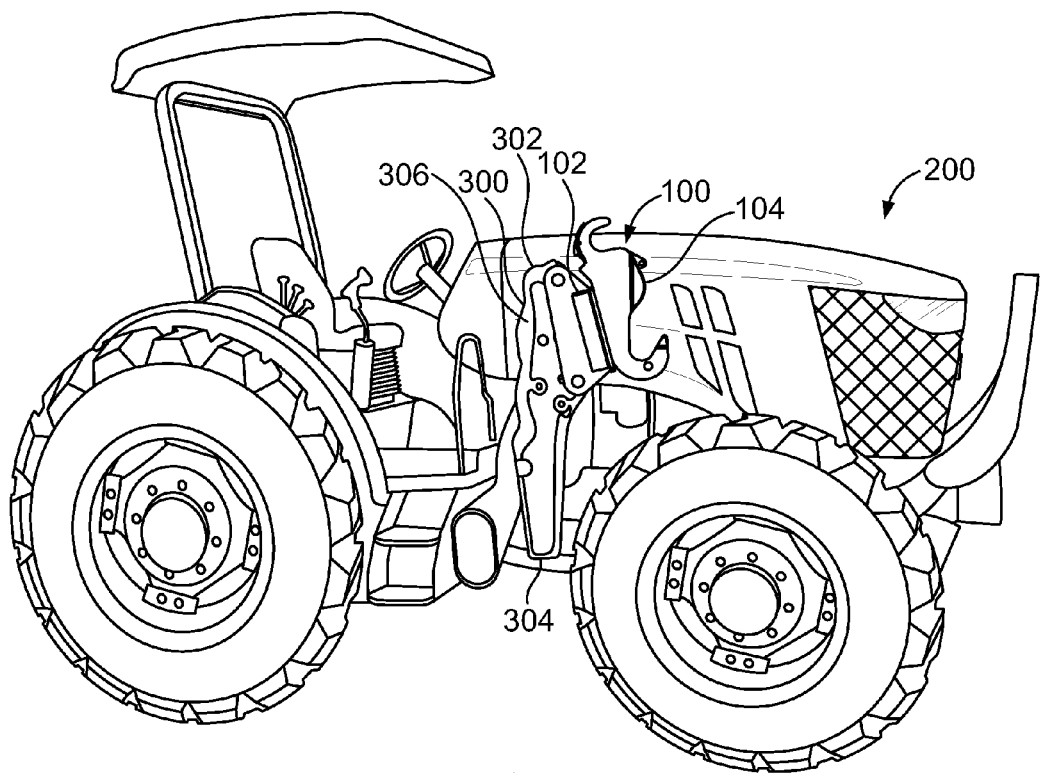
FIG. 10 illustrates a perspective lateral view of an adapter bracket assembly secured to an attachment bracket that is secured to a utility vehicle, according to an embodiment of the present disclosure.

FIG. 10 illustrates a perspective lateral view of the adapter bracket assembly 100 secured to the attachment bracket 300 that is secured to the utility vehicle 200, according to an embodiment of the present disclosure. The attachment member 102 of the adapter bracket assembly 100 is sized, shaped, and configured to mate with the component-connecting end 306 of the attachment bracket 300 in order to securely connect the adapter bracket assembly 100 to the attachment member 102. For example, referring to FIGS. 1, 7, and 10, the upper hole 308 of the component-connecting end 306 may be positioned between the panels 108 of the attachment member 102 with opposed rims 122 pivotally positioned in opposite sides of the upper hole 308. The rod 126 may be cradled within the lower hook 310 of the attachment bracket 300. As noted, the attachment member 102 of the adapter bracket assembly 100 includes the connecting interface 107 that may be the exact same or otherwise similar configuration as that of a utility component that is specifically designed to be compatible with the component-connecting end 306. As such, the adapter bracket assembly 100 secures to the component-connecting end 306 in a similar manner as a compatible utility component would connect to the component-connecting end 306.

However, the component-engaging member 104 includes the connecting interface 127 that is specifically sized, shaped, and otherwise configured to connect to a utility component that is different than the attachment member 300. That is, the component-engaging member 104 is configured to connect to a utility component that would otherwise be incompatible with the attachment member 300. The adapter bracket assembly 100 includes the connecting interface 107 that is compatible with the attachment bracket 300, and the connecting interface 127 that is compatible with a utility component that would otherwise be incompatible with the attachment bracket 300. Because the adapter bracket assembly 100 includes both the connecting interfaces 107 and 127, the adapter bracket assembly 100 is configured to connect a utility component manufactured by a particular manufacturer to the attachment bracket 300 of the utility vehicle 200, which is manufactured by a completely different manufacturer, for example.

The component-engaging member 104 is sized, shaped, and configured to mate with a portion of a different utility component to connect the different utility component to the adapter bracket assembly 100. As such, the adapter bracket assembly 100 is configured to securely connect a different utility component (such as produced by the second manufacturer) to the attachment bracket 300 and the utility vehicle 200 (one or both of which may be produced by the first manufacturer, for example).

Figure 11:
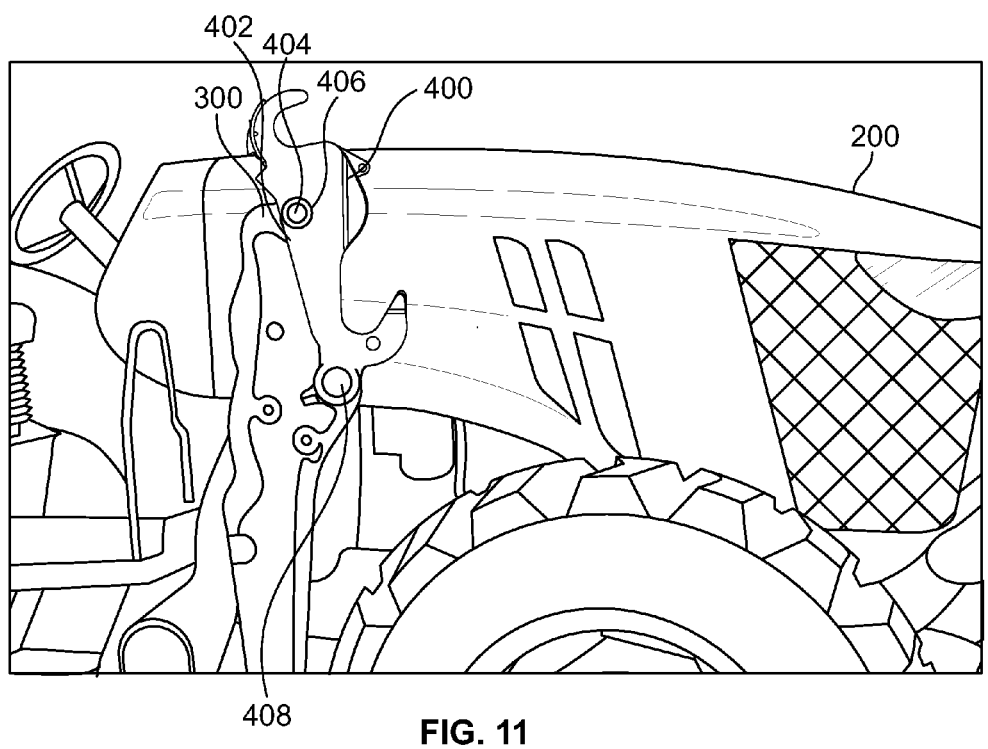
FIG. 11 illustrates a lateral view of an adapter bracket assembly secured to an attachment bracket that is secured to a utility vehicle, according to an embodiment of the present disclosure.

FIG. 11 illustrates a close-up view of an adapter bracket assembly 400 secured to the attachment bracket 300, according to an embodiment of the present disclosure. The adapter bracket assembly 400 is similar to the adapter bracket assembly 100, except that an attachment member 402 may include a connecting interface 404 having an upper pin 406 and a lower pin 408 that connect to a component-engaging member. For example, the pins 406 and 408 may be connected to wall portions of the component-engaging member.

Figure 12:
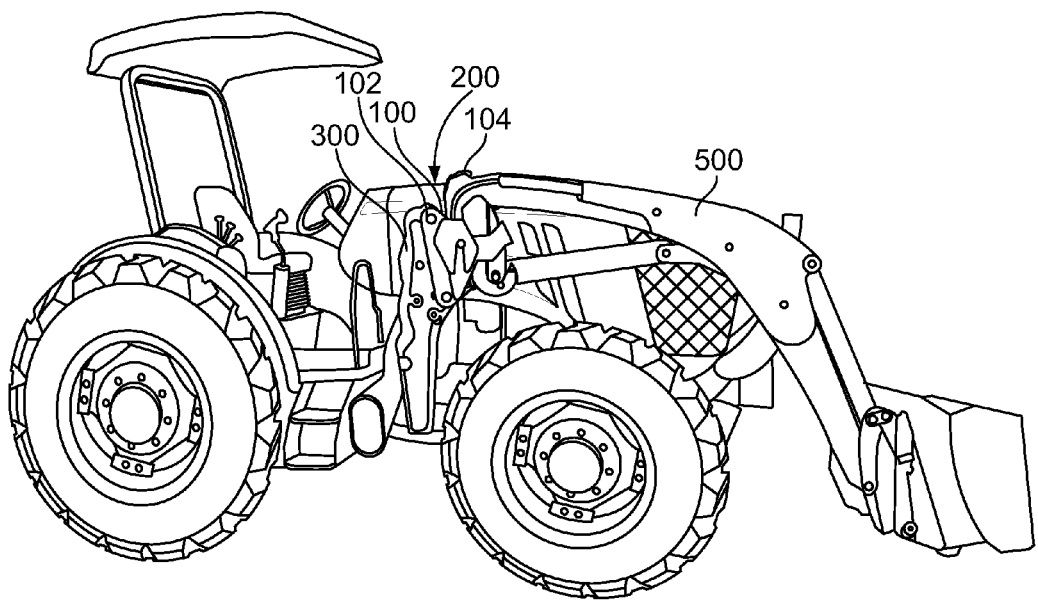
FIG. 12 illustrates a perspective lateral view of an adapter bracket assembly connecting a different utility component to a utility vehicle, according to an embodiment of the present disclosure.

FIG. 12 illustrates a perspective lateral view of the adapter bracket assembly 100 connecting a different utility component 500, such as a front loader, to the utility vehicle 200, according to an embodiment of the present disclosure. The different utility component 500 would otherwise be incompatible, non-compliant, inoperable, or the like (that is, "different") with respect to the utility vehicle 200 if not for the adapter bracket assembly 100. The attachment member 102 of the adapter bracket assembly 100 securely connects to the attachment bracket 300, as described above. The component-engaging member 104 of the adapter bracket assembly 100 securely connects to a portion of the utility component 500, thereby securing the utility component 500 to the attachment bracket 300 and therefore the utility vehicle 200.

Referring to FIGS. 1-5 and 12, the component-engaging member 104 includes the connecting interface 127 that is specifically sized, shaped, and otherwise configured to connect to the utility component 500, which is different than the attachment member 300. The component-engaging member 104 is configured to connect to the utility component 500, which would otherwise be incompatible with the attachment member 300. The adapter bracket assembly 100 includes the attachment member 102 having the connecting interface 107 that is compatible with the attachment bracket 300, and the component-engaging member 104 having the connecting interface 127 that is compatible with the utility component 500 that would otherwise be incompatible with the attachment bracket 300. The utility component 500 is manufactured by a particular manufacturer, while the attachment bracket 300 and the utility vehicle 200 are manufactured by a completely different manufacturer.

Figure 13:
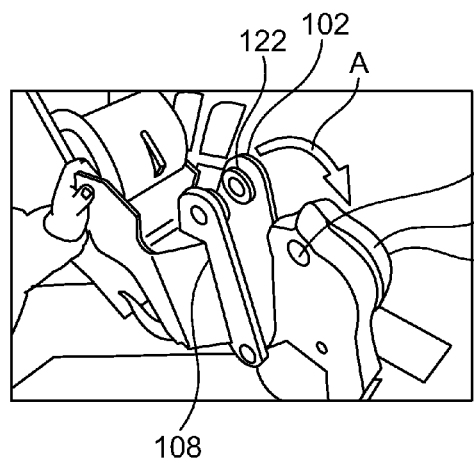
FIG. 13 illustrates a perspective top view of an adapter bracket assembly being positioned on an attachment bracket, according to an embodiment of the present disclosure.

FIG. 13 illustrates a perspective top view of the adapter bracket assembly 100 being positioned on the attachment bracket 300, according to an embodiment of the present disclosure. In order to secure the adapter bracket assembly 100 to the attachment bracket 300, the attachment member 102 is mated with a reciprocal portion of the attachment bracket 300. For example, the attachment member 102 may be positioned over, within, or otherwise in relation to the reciprocal portion of the attachment bracket 300 so that mating interfaces, such as fastener holes, line up with one another.

As shown, the component-connecting end 306 of the attachment bracket 300 is configured to be sandwiched between the opposed lateral walls 108 of the attachment member 102. The attachment member 102 is then pivoted onto the component-connecting end 306 in the direction of arc A so that the rims 122 are aligned with and/or pivotally retained within and/or about the hole 308 of the attachment bracket 300.

Figure 14:
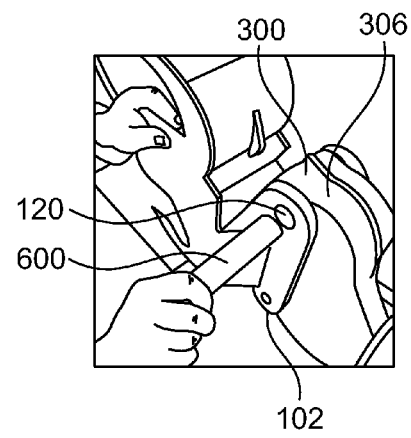
FIG. 14 illustrates a perspective top view of an adapter bracket assembly being securely fixed to an attachment bracket, according to an embodiment of the present disclosure.

FIG. 14 illustrates a perspective top view of the adapter bracket assembly 100 being securely fixed to the attachment bracket 300, according to an embodiment of the present disclosure. After the attachment member 102 is properly positioned with respect to the attachment bracket 300 (such that the rims 122 are retained within the hole 308), one or more fasteners 600, such as metal pins, are used to securely connect the adapter bracket assembly 100 to the attachment bracket 300. For example, a fastener 600, in the form of a metal pin, may pass through the holes 120 of the attachment member 102 and through the hole 308 (shown in FIG. 13) of the attachment bracket 300.

Figure 15:
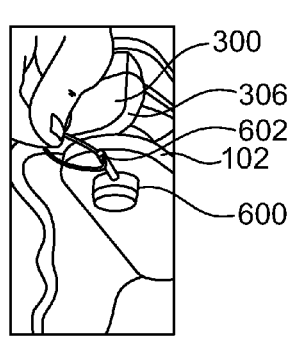
FIG. 15 illustrates a perspective top view of a lynch pin securing a pin in a secured position on an adapter bracket assembly, according to an embodiment of the present disclosure.

FIG. 15 illustrates a perspective top view of a lynch pin 602 securing a pin in a secured position on the adapter bracket assembly 100, according to an embodiment of the present disclosure. A lynch pin 602, for example, may be used to ensure that the fastener 600 remains in a secure connecting position. For example, the fastener 600 may include a channel configured to receive and retain the lynch pin 602, which then prevents the fastener 600 from ejecting from the attachment member 102 and the component-connecting end 306.

Figure 16:
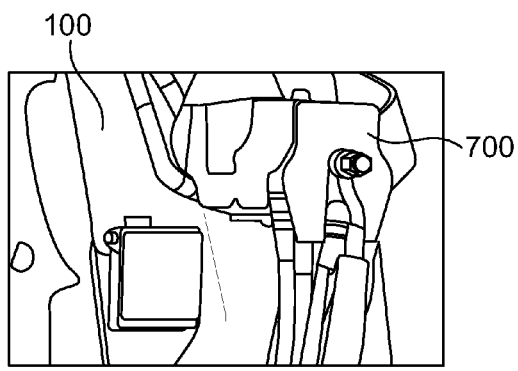
FIG. 16 illustrates a perspective lateral view of a portion of a hydraulic manifold secured to an adapter bracket assembly, according to an embodiment of the present disclosure.

FIG. 16 illustrates a perspective lateral view of a portion of a hydraulic manifold 700 secured to the adapter bracket assembly 100, according to an embodiment of the present disclosure. The hydraulic manifold 700 may be part of the adapter bracket assembly 100, or may optionally be a separate and distinct piece that connects thereto. Alternatively, the hydraulic manifold 700 may not be used.

Figure 17:
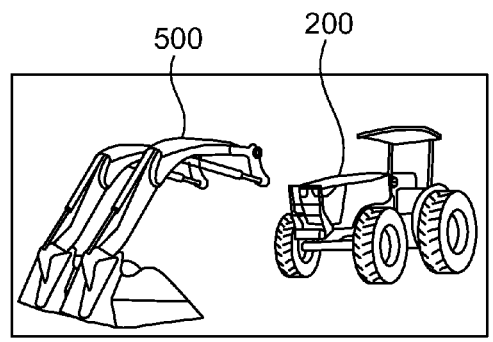
FIG. 17 illustrates a perspective front view of a utility component disconnected from a utility vehicle, according to an embodiment of the present disclosure.

FIG. 17 illustrates a perspective front view of the utility component 500 disconnected from the utility vehicle 200, according to an embodiment of the present disclosure. The utility component 500 may be different from the utility vehicle 200, in that the utility component 500 may be incompatible, non-compliant, inoperable, or the like with respect to the utility vehicle 200 (including its respective attachment bracket 300, as shown in FIGS. 7-12), but for the adapter bracket assembly 100. The adapter bracket assembly 100 connects to the attachment bracket 300, which may be secured to the utility vehicle 200, so that the utility component 500 may be connected to and used with the utility vehicle 200.

Figure 18:
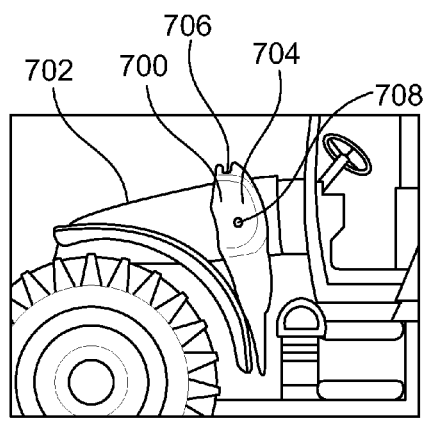
FIG. 18 illustrates a lateral view of an attachment bracket secured to a utility vehicle, according to an embodiment of the present disclosure.

FIG. 18 illustrates a lateral view of an attachment bracket 700 secured to a utility vehicle 702, according to an embodiment of the present disclosure. The attachment bracket 700 may be sized, shaped, and configured differently than the attachment brackets described above. For example, the attachment bracket 700 may include a component-connecting end 704 having an upper ridge 706 and an interior hole 708 that may closer to a center of the attachment bracket 700 (as compared to the hole 308).

Figure 19:
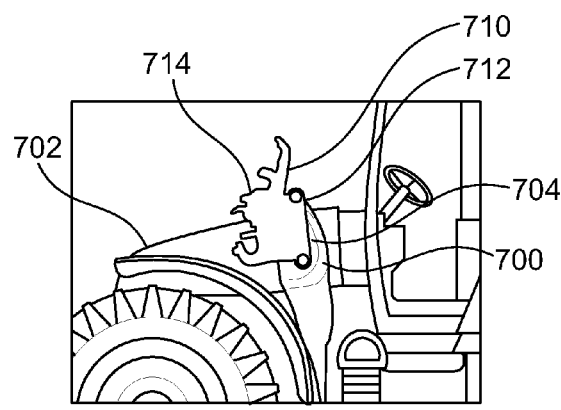
FIG. 19 illustrates a lateral view of an adapter bracket assembly secured to an attachment bracket that is secured to a utility vehicle, according to an embodiment of the present disclosure.

FIG. 19 illustrates a lateral view of an adapter bracket assembly 710 secured to the attachment bracket 700 that is secured to the utility vehicle 702, according to an embodiment of the present disclosure. The adapter bracket assembly 710 includes an attachment member 712 and a component-engaging member 714. The attachment member 712 is specifically sized, shaped, and configured to securely connect and mate with the component-connecting end 704 of the attachment bracket 700. The component-engaging member 714 is specifically sized, shaped, and configured to securely connect and mate with a utility component, such as a loader, which would otherwise be incompatible with the attachment bracket 700, but for the adapter bracket assembly 710.

Figure 20:
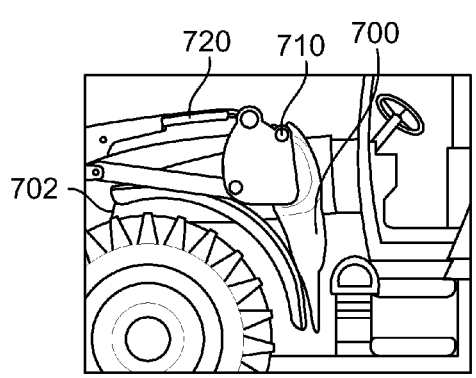
FIG. 20 illustrates a lateral view of a utility component secured to an attachment bracket of a utility vehicle through an adapter bracket assembly, according to an embodiment of the present disclosure.

FIG. 20 illustrates a lateral view of a utility component 720 secured to the attachment bracket 700 of the utility vehicle 702 through the adapter bracket assembly 710, according to an embodiment of the present disclosure. As shown, the utility component 720 may be a loader. Alternatively, the utility component may be various other types.

Figure 21:
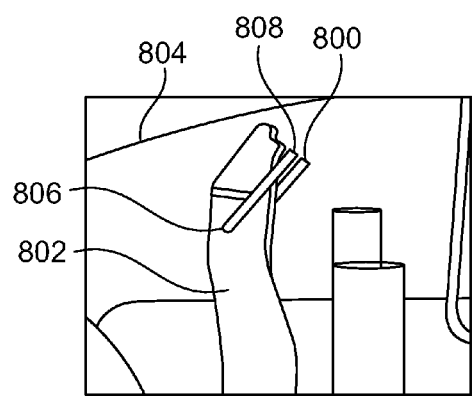
FIG. 21 illustrates a lateral view of an adapter bracket assembly secured to an attachment bracket that is secured to a utility vehicle, according to an embodiment of the present disclosure.

FIG. 21 illustrates a lateral view of an adapter bracket assembly 800 secured to an attachment bracket 802 that is secured to a utility vehicle 804, according to an embodiment of the present disclosure. The adapter bracket assembly 800 may include an attachment member 806, including one or more bars, hooks, and the like, that securely connect to the attachment bracket 802, and a component-engaging member 808, such as lateral beams connected to a bar, that is configured to securely connect to a utility component that would otherwise be incompatible with the attachment bracket 802, but for the adapter bracket assembly 800.

FIG. 22 illustrates a lateral view of an adapter bracket assembly 900 disconnected from an attachment bracket 902 of a utility vehicle 904, according to an embodiment of the present disclosure. The adapter bracket assembly 900 includes an attachment member 906 that is sized, shaped, and configured to secure to the attachment bracket 902, and a component-engaging member 908 that is sized, shaped, and configured to secure to a utility component that would otherwise be incompatible with the attachment bracket 902, but for the adapter bracket assembly 800. As shown, the attachment member 906 may include planar walls or panels 910, while the component-engaging member 908 may include hooks or claws 912.

FIG. 23 illustrates a lateral view of an adapter bracket assembly 1000 disconnected from an attachment bracket 1002 of a utility vehicle 1004, according to an embodiment of the present disclosure. The adapter bracket assembly 1000 includes an attachment member 1006 that is sized, shaped, and configured to secure to the attachment bracket 1002, and a component-engaging member 1008 that is sized, shaped, and configured to secure to a utility component that would otherwise be incompatible with the attachment bracket 1002, but for the adapter bracket assembly 1000. As shown, the attachment member 1006 may include planar walls or panels 1010, while the component-engaging member 1008 may include planar walls or panels 1012.

FIG. 24 illustrates an end view of an adapter bracket assembly 1100 secured to an attachment bracket 1102, according to an embodiment of the present disclosure. The attachment bracket 1102 may include a main body 1104 that is configured to connect to a utility vehicle and a component-mounting structure 1106 that extends outwardly from a side of the main body 1104 through one or more extension beams 1108.

The adapter bracket assembly 1100 includes an attachment member 1110 and a component-engaging member 1112, similar to any of those described above. As shown, the component-engaging member 1112 may be outwardly offset from the attachment member 1110. As such, the component-engaging member 1112 does not interfere with the main body 1104 of the attachment bracket. Instead, the attachment member 1110 securely connects to the component-mounting structure 1106 such that the component-engaging member 1112 is spaced away a distance 1120 from the main body 1104. As such, the adapter bracket assembly 1100 may be used with various attachment brackets having varying distances between the component-mounting structure 1106 and the main body 1104. For example, the length of the extension beams 1108 may be greater or lesser than shown. The extension beams 1108 are generally longer than a width 1122 of an interior portion 1124 (for example, the portion of the adapter bracket assembly 1100 that is positioned between the component-engaging member 1112 and the main body 1104). Accordingly, the interior portion 1124 may be sized and shaped so as not to interfere with the main body 1104.

Referring to FIGS. 1-24, it is to be understood that the attachment members and component-engaging members of the adapter bracket assemblies may be various sizes, shapes, and configurations, depending on the sizes, shapes, and configurations of the attachment brackets and utility components to which the adapter bracket assemblies are configured to secure. Claws, walls, pins, posts, rods, and the like may be used with respect to connecting interfaces. The sizes, shapes, and configurations of the attachment members and component-engaging members described in the present application are merely exemplary.

Embodiments of the present disclosure provide a method of connecting a different utility component to a utility vehicle. The method includes securing an adapter bracket assembly to an attachment bracket, such as an original attachment bracket that is sold with (or otherwise compatible with) the utility vehicle. The different utility component, such as a front loader, then connects to the adapter bracket assembly.

As described above, at least one embodiment of the present disclosure provides an adapter bracket assembly that allows a loader manufactured by one company to be mounted on a loader mount (such as an attachment bracket) manufactured by a different company.

The various connecting interfaces, fasteners, sizes, and shapes shown in the illustrations are merely exemplary. It is to be understood that various interfaces may be used to connect a utility component to a component-engaging member. The component-engaging member of the adapter bracket assembly may be various shapes and sizes, with various arrangements, configurations, orientations, and the like of connecting interfaces that may be used to connect to various types of utility components, other than those shown and described. Similarly, the attachment member of the adapter bracket assembly may be various shapes and sizes, with various arrangements, configurations, orientations, and the like of connecting interfaces that may be used to connect to various types of attachment brackets, other than those shown and described.

Embodiments of the present disclosure may be used with various work or utility vehicles and/or equipment. For example, embodiments of the present disclosure may be used with respect to tractors, front loaders, backhoes, skid steers, and the like, such as described in U.S. Pat. No. 7,160,077, entitled "Grapple Assembly, A Front end Loader Having a Grapple Assembly, and Method for Operating a Grapple, Assembly," U.S. Pat. No. 7,431,554, entitled "Pinching Fingers Attachment for Utility Vehicles," U.S. Pat. No. 7,566,197, entitled "Independent Hydraulic Pinching Fingers Attachment for Utility Vehicles," and U.S. Pat. No. 8,221,049, entitled "Independent Hydraulic Pinching Fingers with Detachable Secondary Implement," all of which are hereby incorporated by reference in their entireties.

As described above, embodiments of the present disclosure provide adapter bracket assemblies that may be used to adapt or transform utility vehicles to be used with different utility components. For example, embodiments of the present disclosure provide adapter bracket assemblies that may connect an attachment bracket of a first manufacturer to a utility component of a second manufacturer that differs from the first manufacturer.

Embodiments of the present disclosure allow an individual to use a utility component of one manufacturer, for example, with a utility vehicle of a different manufacturer, for example. At the same time, embodiments of the present disclosure allow for an originally-supplied attachment bracket that connects to the utility vehicle to be retained and used (instead of being discarded). The adapter bracket assembly connects to the attachment bracket. Accordingly, an individual does not need to purchase a separate and distinct attachment bracket (and discard the original attachment bracket) in order to use the different utility component with the utility vehicle.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An adapter bracket assembly configured to allow a tractor to operatively connect to a different utility component, the adapter bracket assembly comprising:
   an attachment member configured to securely connect to an attachment bracket that is compatible with the tractor, wherein the attachment member comprises opposed lateral panels having outer exposed edges connected to upper and lower arcuate ends, wherein each of the upper and lower arcuate ends connects to connecting edges that connect to a transition connection interface, wherein each of the upper arcuate ends includes a first hole and a cylindrical rim, and wherein each lower arcuate end connects to a cylindrical bar; and
   a component-engaging member that is configured to securely connect to the different utility component in order to securely and operatively connect the different utility component to the tractor,
   wherein the attachment member is axially offset from the component-engaging member.

2. An adapter bracket assembly configured to allow a tractor to operatively connect to a different utility component, wherein the tractor is manufactured by a first manufacturer, and wherein the different utility component is manufactured by a second manufacturer that differs from the first manufacturer, the adapter bracket assembly comprising:
   an attachment member configured to securely connect to an attachment bracket that is compatible with the tractor; and
   a component-engaging member that is configured to securely connect to the different utility component in order to securely and operatively connect the different utility component to the tractor, wherein the attachment member is axially offset from the component-engaging member,
   wherein each of the attachment member and the component-engaging member comprises one or more of at least one wall, at least one panel, at least one arcuate surface, at least one bar, at least one hook, at least one clasp, and at least one stud.

3. The adapter bracket assembly of claim 2, wherein the different utility component is incompatible with the tractor and unable to be used with the tractor without the adapter bracket assembly.

4. The adapter bracket assembly of claim 2, wherein the different utility component is one or more of incompatible, non-compliant, or inoperable with respect to the tractor.

5. The adapter bracket assembly of claim 2, further comprising a transition connection interface that connects the attachment member to the component-engaging member.

6. The adapter bracket assembly of claim 2, wherein the attachment member comprises opposed lateral panels having outer exposed edges connected to upper and lower arcuate ends, wherein each of the upper and lower arcuate ends connects to connecting edges that connect to a transition connection interface, wherein each of the upper arcuate ends includes a first hole and a cylindrical rim, and wherein each lower arcuate end connects to a cylindrical bar.

7. The adapter bracket assembly of claim 2, wherein the component-engaging member comprises first and second grappling claws.

8. The adapter bracket assembly of claim 7, wherein at least one of the first and second grappling claws comprises opposed prongs, wherein each of the opposed prongs comprises an outwardly flared distal tip.

9. The adapter bracket assembly of claim 2, further comprising a hydraulic manifold secured to one or more portions of one or both of the attachment member or the component-engaging member.

10. An adapter bracket assembly configured to allow a tractor to operatively connect to a different utility component, wherein the tractor is manufactured by a first manufacturer, and wherein the different utility component is manufactured by a second manufacturer that differs from the first manufacturer, the adapter bracket assembly comprising:
  an attachment member configured to securely connect to an attachment bracket that is compatible with the tractor, wherein the attachment member comprises a first connecting interface that is compatible with the attachment bracket, wherein the first connecting interface is sized, shaped, and configured as a third connecting interface of a compatible utility component that is compatible with the tractor and configured to directly connect to the attachment bracket without the adapter bracket assembly; and
  a component-engaging member that is configured to securely connect to the different utility component in order to securely and operatively connect the different utility component to the tractor, wherein the component-engaging member comprises a second connecting interface that is compatible with the different utility component.

11. The adapter bracket assembly of claim 10, wherein each of the attachment member and the component-engaging member comprises one or more of at least one wall, at least one panel, at least one arcuate surface, at least one bar, at least one hook, at least one clasp, and at least one stud.

12. The adapter bracket assembly of claim 10, wherein the first connecting interface mimics a compatible connecting interface of a compatible utility component that is compatible with the attachment bracket.

13. The adapter bracket assembly of claim 10, wherein the attachment member is axially offset from the component-engaging member.

14. An adapter bracket assembly configured to allow a tractor to operatively connect to a different utility component, wherein the tractor is manufactured by a first manufacturer, and wherein the different utility component is manufactured by a second manufacturer that differs from the first manufacturer, the adapter bracket assembly comprising:
  an attachment member configured to securely connect to an attachment bracket that is compatible with the tractor, wherein the attachment member comprises a first connecting interface that is compatible with the attachment bracket; and
  a component-engaging member that is configured to securely connect to the different utility component in order to securely and operatively connect the different utility component to the tractor, wherein the component-engaging member comprises a second connecting interface that is compatible with the different utility component, wherein the second connecting interface is sized, shaped, and configured as a third connecting interface of a different attachment bracket that is incompatible with the tractor and configured to directly connect to the different utility component.

15. The adapter bracket assembly of claim 14, wherein the attachment member is axially offset from the component-engaging member.

16. An adapter bracket assembly configured to allow a tractor to operatively connect to a different utility component, wherein the tractor is manufactured by a first manufacturer, and wherein the different utility component is manufactured by a second manufacturer that differs from the first manufacturer, the adapter bracket assembly comprising:
  an attachment member configured to securely connect to an attachment bracket that is compatible with the tractor, wherein the attachment member comprises opposed lateral panels having outer exposed edges connected to upper and lower arcuate ends, wherein each of the upper and lower arcuate ends connects to connecting edges that connect to a transition connection interface, wherein each of the upper arcuate ends includes a first hole and a cylindrical rim, and wherein each lower arcuate end connects to a cylindrical bar; and
  a component-engaging member that is configured to securely connect to the different utility component in order to securely and operatively connect the different utility component to the tractor.

17. The adapter bracket assembly of claim 16, wherein the attachment member is axially offset from the component-engaging member.

18. An adapter bracket assembly configured to allow a tractor to operatively connect to a different utility component, wherein the tractor is manufactured by a first manufacturer, and wherein the different utility component is manufactured by a second manufacturer that differs from the first manufacturer, the adapter bracket assembly comprising:
  an attachment member configured to securely connect to an attachment bracket that is compatible with the tractor; and
  a component-engaging member that is configured to securely connect to the different utility component in order to securely and operatively connect the different utility component to the tractor, wherein the component-engaging member comprises first and second grappling claws.

19. The adapter bracket assembly of claim 18, wherein the attachment member is axially offset from the component-engaging member.

20. A system comprising:
  a tractor;
  an attachment bracket secured to the tractor, wherein the attachment bracket is compatible with the tractor and a first utility component; and an adapter bracket assembly that is configured to connect to both of a (a) second utility component that differs from the first utility component and (b) the attachment bracket, wherein the second utility component is unable to be used with the attachment bracket without the adapter bracket assembly, wherein the adapter bracket assembly comprises:

an attachment member configured to securely connect to the attachment bracket, wherein the attachment member comprises a first connecting interface that is compatible with the attachment bracket, wherein the first connecting interface is sized, shaped, and configured as a third connecting interface of a compatible utility component that is compatible with the tractor and configured to directly connect to the attachment bracket without the adapter bracket assembly; and a component-engaging member that is configured to securely connect to the second utility component, wherein the component-engaging member comprises a second connecting interface that is compatible with the second utility component.

21. The system of claim 20, wherein each of the first and second utility components is one of a loader, backhoe, crane, grappling assembly, or boom.

22. The system of claim 20, wherein the tractor is manufactured by a first manufacturer, and wherein the second utility component is manufactured by a second manufacturer that differs from the first manufacturer.

23. The system of claim 20, wherein the first connecting interface mimics a compatible connecting interface of a compatible utility component that is compatible with the attachment bracket.

24. The system of claim 20, wherein the second utility component is one or more of incompatible, non-compliant, or inoperable with respect to the tractor and the attachment bracket.

25. The system of claim 20, wherein the attachment member is axially offset from the component-engaging member.

26. A system comprising:

a tractor;

an attachment bracket secured to the tractor, wherein the attachment bracket is compatible with the tractor and a first utility component; and an adapter bracket assembly that is configured to connect to both of a (a) second utility component that differs from the first utility component and (b) the attachment bracket, wherein the second utility component is unable to be used with the attachment bracket without the adapter bracket assembly, wherein the adapter bracket assembly comprises:

an attachment member configured to securely connect to the attachment bracket, wherein the attachment member comprises a first connecting interface that is compatible with the attachment bracket; and a component-engaging member that is configured to securely connect to the second utility component, wherein the component-engaging member comprises a second connecting interface that is compatible with the second utility component, wherein the second connecting interface is sized, shaped, and configured as a third connecting interface of a different attachment bracket that is incompatible with the tractor and configured to directly connect to the second utility component.

27. The system of claim 26, wherein the attachment member is axially offset from the component-engaging member.

* * * * *